July 30, 1963 A. T. WILLIAMS 3,099,749
PHOTOELECTRIC DEVICE FOR MEASUREMENT OF AREAS
Filed July 12, 1961 3 Sheets-Sheet 1
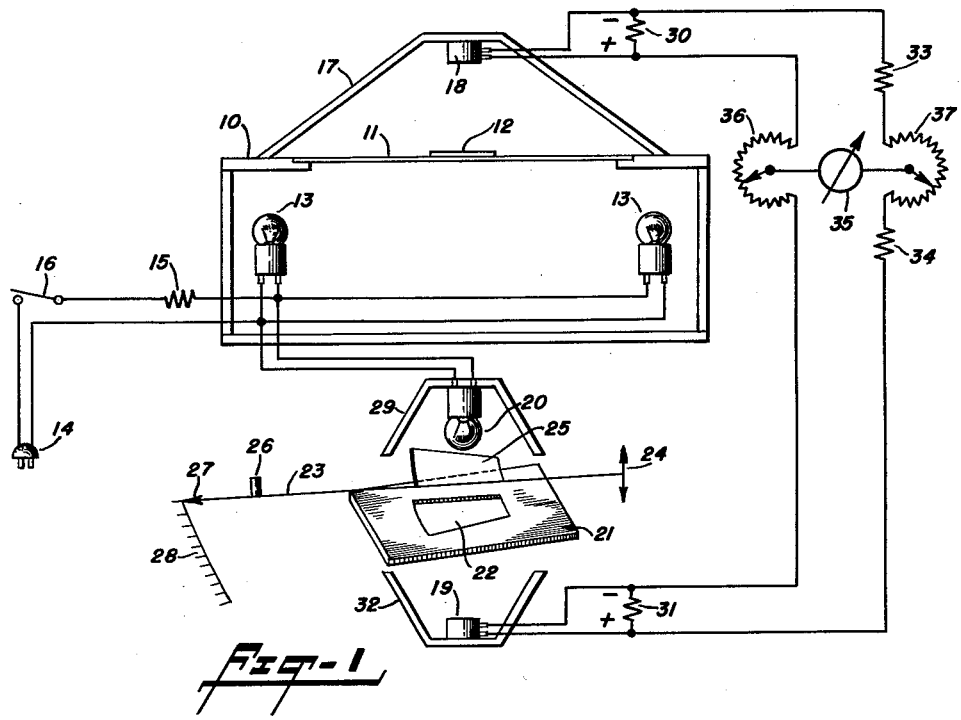
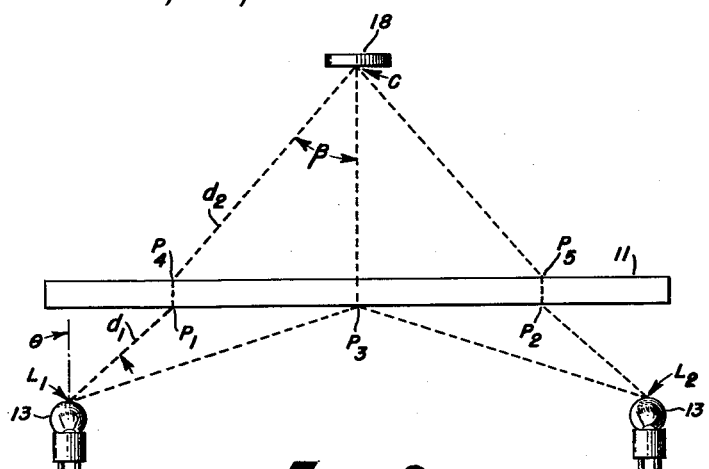
ALEXANDER T. WILLIAMS
INVENTOR.
BY
Rudolph J. Jurick
ATTORNEY July 30, 1963 A. T. WILLIAMS 3,099,749
PHOTOELECTRIC DEVICE FOR MEASUREMENT OF AREAS
Filed July 12, 1961 3 Sheets-Sheet 2

ALEXANDER T. WILLIAMS
INVENTOR.

BY
ATTORNEY

July 30, 1963 A. T. WILLIAMS 3,099,749
PHOTOELECTRIC DEVICE FOR MEASUREMENT OF AREAS
Filed July 12, 1961 3 Sheets-Sheet 3

ALEXANDER T. WILLIAMS
INVENTOR.

BY
ATTORNEY

United States Patent Office 3,099,749
Patented July 30, 1963

3,099,749
PHOTOELECTRIC DEVICE FOR MEASUREMENT OF AREAS
Alexander T. Williams, 829 Shackamaxon Drive, Westfield, N.J.
Filed July 12, 1961, Ser. No. 123,509
9 Claims. (Cl. 250—210)

This invention relates to apparatus for the measurement of areas and more particularly to photoelectric apparatus for the direct measurement of the area of opaque, mono-planar material.

In various fields of manufacture, there exists a requirement for a device by which the area of an opaque sheet of material, or the like, can be measured directly, conveniently and accurately. For example, in the glove manufacturing industry, it is necessary to know the area of the cut material going into the finished product for pricing purposes. Of equal, or perhaps more importance, is the provision of a device which can be used by skilled or unskilled help for the direct measurement of areas of cross-section drawings such as used by contractors when constructing highways, parking lots, etc.

In the field of civil engineering, it is the present practice to obtain the total area of a cross sectional road drawing by dividing the drawing into smaller, discrete, areas of more or less regular geometric configurations, such as squares, rectangles, triangles, circles. The area of each such discrete portion is calculated mathematically and then totalled to obtain the area of the desired cross section. It is obvious that the possibility for error in such operation is considerable. Electronic computers have been used for this purpose but the high cost thereof places them beyond the reach of many engineers and contractors. Also, a device known as a planimeter is available for determining the cross sectional area of irregular configurations. These, however, are not widely used because they are of limited range and subject to error due to slippage of the wheel which must be guided in frictional contact with the perimeter of the surface being measured. Further, a planimeter cannot be used with reliability by unskilled individuals.

A device made in accordance with this invention combines convenience, accuracy and reliability and is of relatively low cost. The use of the device may safely be entrusted to unskilled help for the measurement of the area of a flat opaque member regardless of the configuration thereof. Although the device is useful in many fields, it has particular utility for the direct measurement of the area of a cross-sectional drawing such as used in the construction of roads. Briefly, the device comprises a translucent plate disposed between a source of light and a photoelectric cell. An opaque member to be measured is placed upon the plate thereby reducing the quantity of light impinging upon the active surface of the photocell. A second photocell is subjected to a constant quantity of light and the electrical outputs of the two photocells are balanced against each other by means which provide a direct measure of the total area of the member positioned on the translucent plate. An important feature of the device is the arrangement of the light source in such manner that the illumination passing through the translucent plate results in each ray of light striking the photocell surface producing an equal incremental output of the photocell, thereby eliminating a variable which otherwise would make the measured area value dependent upon the specific location of the member on the translucent plate.

An object of this invention is the provision of an improved photoelectric device for the direct measurement of the total area of regular or irregular flat surfaces.

An object of this invention is the provision of photoelectric apparatus for the direct measurement of the total area of an opaque surface, or specimen, which device has a high sensitivity, high accuracy and repeatability of result, and which can be used quickly and conveniently by unskilled persons.

An object of this invention is the provision of a photoelectric area-measuring device which includes means compensating for the photometric inverse square law and cosine effects whereby the device does not involve a critical positioning of the area to be measured with respect to the optical system of the device.

An object of this invention is the provision of a photoelectric device for the measurement of the total area of a flat specimen which device comprises a pair of photocells arranged in a balanced bridge circuit, means for supporting the specimen between a light source and one of the photocells thereby to unbalance the bridge, adjusting means controlling the quantity of light striking the other photocell to rebalance the bridge, and a scale calibrated in factors of area and cooperating with the said adjusting means to provide a direct reading of the area of the specimen upon a rebalancing of the bridge.

These and other objects and advantages will become apparent from the following description when taken with the accompanying drawings. It will be understood, however, that the drawings are for purposes of description and are not to be construed as defining the scope or limits of the invention, reference being had for the latter purpose to the claims appended hereto.

In the drawings wherein like reference characters denote like parts in the several views;

FIGURE 1 is a diagrammatic presentation of a device made in accordance with this invention;

FIGURE 2 illustrates the fundamental laws of photometry which must be considered in the design of the device to make the device direct reading;

Figure 3:
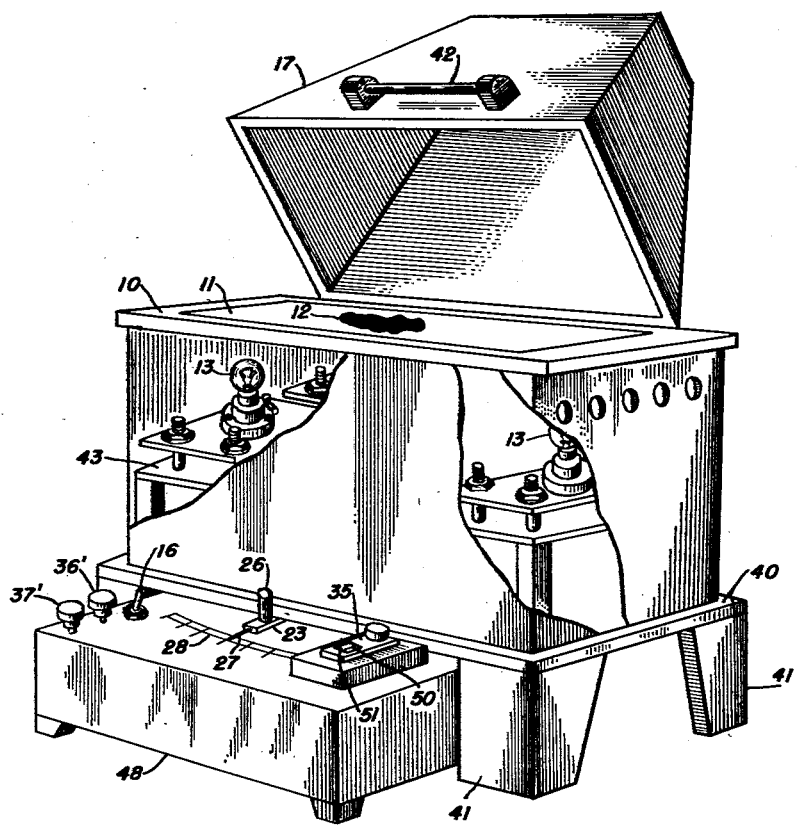
FIGURE 3 is an isometric view of the device with portions of the main housing broken away.

Reference now is made to FIGURE 1 wherein there is shown a housing 10 carrying a flat diffusing glass 11 which constitutes a plate for the support of a specimen to be measured, as, for example, the opaque piece of paper identified by the numeral 12. The plate is illuminated by a plurality of lamps 13 connected in parallel to the usual source of household power by a plug 14 through a voltage-dropping resistor 15 and a conventional on-off switch 16. In the case of a 120 volt power line, the value of the resistor 15 is selected so that the voltage applied to the lamps is approximately 105 volts. This results in a small reduction in the lumen output of the lamps, which is of no consequence, but the normal operating life of the lamps is increased considerably in this manner. The light transmitted through the glass 11 is integrated by the light-reflecting walls of the integrating chamber 17 and strikes the active surface of the photocell 18, the walls of the chamber preferably being coated with a white paint for this purpose. The illumination on the photocell is proportional to the total light transmitted through the glass plate 11. When the specimen 12 is positioned on the glass plate, the illumination on the photocell is decreased, the actual decrease depending upon the total area of the specimen irrespective of its configuration.

A second photocell 19 is illuminated by a separate lamp 20 which is connected in parallel with the lamps 13. Interposed between the photocell 19 and lamp 20 is a fixed mask 21 having an aperture 22 formed therein.

An arm 23, pivotally mounted at 24, has secured thereto an opaque vane 25, which vane is adapted to overlie the aperture to thereby vary the illumination on the photocell 19 depending upon the position of the arm 23. The arm is provided with a suitable handle 26 to facilitate rotation thereof and the free end of the arm is provided with a pointer 27 which cooperates with a scale 28 calibrated in units of area such as square inches. Suitable housing members 29, 32 are provided so that the photocell 19 responds only to light rays from the lamp 20 and passing through the aperture 22.

The two photocells 18, 19 are connected in a bridge circuit, each photocell being electrically shunted by the fixed resistors 30, 31, respectively. Photoelectric cells, particularly the selenium, barrier layer type, do not have a constant, stable resistance. Although these photocells generate an electrical current (without a biasing voltage applied thereto) which is strictly linear relative to the quanta of light energy falling thereon, the structure of the photocell results in the flow of the generated current in two paths, namely, through the internal resistance of the photocell and through the load that is connected to the photocell. Thus, the effective output current of the photocell varies with the internal resistance of the photocell and such variation depends upon the ratio of the photocell resistance to the load resistance. By making the load resistors 30, 31 of low ohmic resistance relative to the internal resistance of the associated photocells, the current flowing through the load will be substantially constant, for a given illumination of the photocells, irrespective of the photocell resistance. For example, due to temperature, humidity, etc., changes, the internal resistance of a barrier layer photocell may vary from, say, 4900 to 2400 ohms, even though the illumination and the load resistance remains constant. Assume, now, that such a photocell is illuminated at a level such that the generated current is 100 microamperes and that the load resistance is 100 ohms. Under these conditions, when the internal resistance of the photocell is 4900 ohms, the current flowing in the load circuit is 98 microamperes. When the internal resistance of the photocell drops to 2400 ohms, the current flowing in the load circuit will be 96 microamperes. Thus, for a change of 100 percent in the photocell resistance, the change in the load current is 2 percent.

It will be seen that the photocell 18 shunted by the resistor 30 and the photocell 19 shunted by the resistor 31 form two arms of an electrical bridge, the other arms of the bridge being the fixed resistors 33 and 34. In a single range device, as shown in the drawings, the ohmic value of each fixed resistor 33 and 34 is substantially the same as that of the load resistors 30 and 31, namely 100 ohms. A sensitive electrical indicating instrument 35, preferably a zero-center galvanometer of the suspension type, is connected across the output terminals of the bridge through potentiometers 36, 37, which potentiometers are used to balance, or standardize, the circuit. The potentiometer 37 is of a relatively high resistance as compared to the potentiometer 36, whereby the former is used for coarse adjustments and the latter for fine adjustments.

Operation of the device will now be described. The paper 12 is removed from the glass plate, the lamps are energized by closure of the switch 16 and the pointer 27 is aligned with the zero mark on the scale 28. Under these conditions, each of the photocells is subjected to the maximum illumination whereby the individual output currents flowing through the bridge resistors 30 and 31 are substantially equal. The bridge now is balanced by adjustment of one or both of the potentiometers 36, 37, a precise bridge balance condition being obtained when the galvanometer 35 indicates zero. The paper to be measured is then placed upon the glass plate 11 thereby reducing the illumination striking the photocell 18 and correspondingly unbalancing the bridge. The arm 23 is then moved by hand, either directly or through a reduction gearing, in the up-scale direction thereby moving the vane 25 over the aperture 22 and correspondingly reducing the illumination on the photocell 19. Upon the reestablishment of a balance bridge condition, as obtained by a zero indication on the galvanometer, the pointer 27 will be aligned with a scale mark corresponding to the area of the paper 12.

One important feature of the invention resides in the fact that the device is direct reading. In order to achieve this highly desirable result, it is necessary that any given piece of opaque paper, placed upon the glass plate, will result in the same indication of the pointer 27, relative to the scale 28, irrespective of position of the paper on the glass plate. As an illustration, if the paper 12 has a predetermined area of, say, 1 square inch, a reading of 1 square inch must be provided by the device when the paper is positioned in the center of the glass plate or at any corner thereof. This factor becomes of increasing practical considerations when the area of the object being measured is small compared to the total illuminated area of the glass plate. In order to accomplish this result, the apparatus has been designed to fulfill two important laws of photometry, namely, (a) the inverse square law which states that the illumination at any point is equal to the candle power of the lamp divided by the square of the distance between the lamp and the chosen point, and (b) the cosine law which defines the effect of a light ray striking a surface at an angle instead of the normal incidence. These laws may be expressed as follows:

$$I = \left(\frac{CP}{d^2}\right) \cos \theta$$

where:
$I$ = illumination at a given point,
$CP$ = total candle power of the light source,
$d$ = distance between light source and the given point, and
$\theta$ = the angle at which the light ray strikes the surface.

Reference is now made to FIGURE 2. The lamps 13, 13 are so located that the distances $L_1P_1$ and $L_2P_2$ are substantially shorter than the distances $L_1P_3$ and $L_2P_3$. As a matter of simplification, we shall consider only one lamp for analysis of the light ray pattern. As stated hereinabove, the illumination at the point $P_1$ is equal to the candle power of the lamp 13 divided by the square of the distance ($d_1$) and multiplied by the cosine of the angle ($\theta$). Consequently, the illumination ($CP_4$), at the point $P_4$, is the illumination at the point $P_1$ multiplied by the transmission factor (T) of the glass plate, or $$CP_4 = T\left(\frac{CP}{d_1^2}\right) \cos \theta$$

This illumination at the point $P_4$, on the top surface of the glass, constitutes what may be termed a secondary source of light energy and which impinges on the surface of the photocell. However, the value of the illumination ($CP_c$), striking the photocell, is effected by the distance $d_2$ and the cosine of the angle $\beta$, or $$CP_c = \left(\frac{CP_4}{d_2^2}\right) \cos \beta$$

In order to assure proper operation of the device, the product of the light energy and the photocell response must be constant for each point on the diffusing glass 11, or, expressed mathematically, $$\left[T\left(\frac{CP}{d_1^2}\right) \cos \theta\right]\left[\left(\frac{CP_4}{d_2^2}\right) \cos \beta\right] = K$$

When the product of the light energy and the photocell response meets this mathematical requirement, then an opaque piece of paper placed anywhere on the glass plate will produce a constant decrease in the output of the photocell. Stated another way, the decrease in the photocell output will depend solely upon the area of the paper irrespective of where the paper may be positioned on the glass plate. This result is achieved in my device by proper placement of a plurality of lamps for illumination of the glass plate.

Reference is now made to FIGURE 3 which shows one practical form of the device. The main housing 10 is supported on a platform 40 provided with legs 41. The glass plate 11, mounted with its upper surface flush with that of the housing, serves as a support for the specimen to be measured as, for example, the piece of opaque paper 12. The integrating chamber 17 is pivotally secured to the housing by means of a hinge, not visible in the drawing, and is provided with a suitable handle 42 to facilitate the raising and lowering of the chamber for placement or removal of the specimen. Although not visible in FIGURE 3, the photocell 18, see FIGURE 1, is secured to the top inner surface of the chamber 17. A horizontal partition 43 divides the housing into two sections and supports the lamps 13, which lamps are divided into two sets of 2 each spaced along the side walls of the housing 10. Each lamp is rated at 120 volts, 15 watts, which provides sufficient illumination for a device wherein the glass plate is approximately 6" x 18", the inner walls of the housing and integrating chamber being painted white to provide good light reflection. Obviously, the number and wattage rating of the lamps may be varied.

Figure 4:
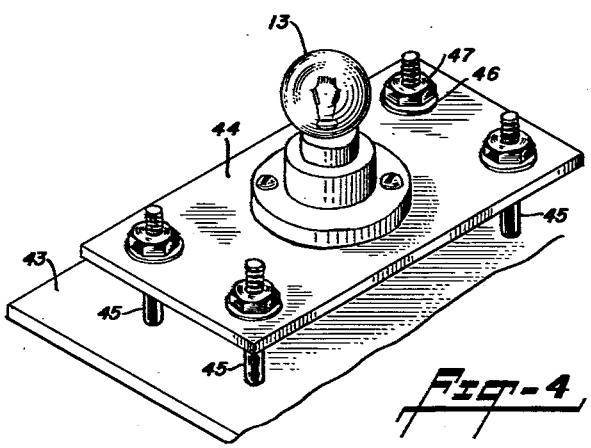
FIGURE 4 is an isometric view showing the adjustable mounting arrangement for the lamps.

As best shown in FIGURE 4, each lamp is mounted for independent adjustment for the purpose of obtaining a proper distribution of the light according to the inverse square law and cosine law. The lamp socket is secured to a mounting plate 44 which is supported from the partition 43 by four bolts 45. Each bolt passes through a substantially enlarged clearance hole formed in the mounting plate. Associated with each bolt is an upper washer 46 (of greater diameter than the hole in the mounting plate) and an upper nut 47 and a similar washer and nut disposed under the mounting plate and not visible in the drawing. It will be apparent this arrangement provides a means for securely securing the mounting plate while affording a limited degree of adjustment of the lamp position in all directions. As a practical matter, once having determined the number of lamps, the position and spacing thereof relative to the particular glass plate, the extent of adjustment afforded by the described, individual, lamp mounting means is sufficient to compensate for variations in the transmission of the glass plate, reflection coefficient variations in the light-reflecting inner walls of the housing and integrating chamber, and possible variations in the housing construction.

Reverting back to FIGURE 3, a sub-housing 48 carries the line switch 16, potentiometer knobs 36', 37', galvanometer 35 and the calibrated scale 28. The upper surface of the sub-housing is spaced somewhat from the platform 40 thereby providing an opening for the rotatable arm 23 carrying the pointer 27 and the handle 26. Having removed the specimen 12 from the glass plate and lowered the chamber 17 to normal, closed, position, the operator aligns the pointer 27 with the zero mark on the scale 28 and adjusts one or both potentiometer knobs 36', 37' until the pointer 50 of the galvanometer is aligned with the zero mark on its scale 51, thereby standardizing the device for the measuring function. The specimen 12 is then placed anywhere on the glass plate and the arm 23 moved until the galvanometer reading is again zero, whereby the area of the specimen is read directly from the scale 28.

The galvanometer 35 may be a commercially available instrument having a sensitivity of ¼ microampere per scale division. This, together with the circuit constants given hereinabove, the use of four (4) 15 watt lamps 13, and a 25 watt lamp 20, results in a device having ample sensitivity and an accuracy of 1 percent over the entire range of the scale 28. In order to reduce to a minimum the time required for standardizing the measurement, the galvanometer preferably is critically damped.

Figure 5:
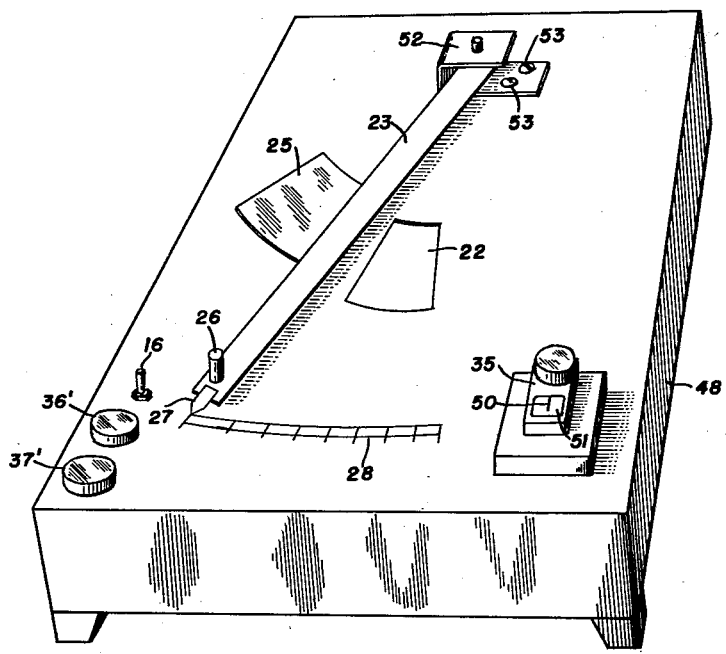
FIGURE 5 is an isometric view of the sub-housing.

In a device constructed as shown in FIGURE 3, the sub-housing 48 also carries the second photocell and the pivoted assembly of the adjusting arm 23. As shown in FIGURE 5, the arm 23 is pivotally carried by a bracket 52 which is secured to the upper surface of the sub-housing 48 as by the screws 53. The vane 25, secured to the arm 23 in any suitable manner, will overlie more or less of the aperture 22 depending upon the position of the arm thereby controlling the amount of light passing through the aperture 22 and striking the second photocell 19 which is secured in fixed position within the sub-housing. Preferably, the aperture 22 is covered by a diffusing glass. The single lamp for illuminating the second photocell can be carried by a socket secured to the lower side of the partition 43, see FIGURE 3. It will be apparent that the partition 43 serves to prevent light from the lamps 13 from effecting the second photocell which is disposed within the sub-housing. In the complete device, the sub-housing is secured in fixed position relative to the main housing so that the device readily is portable as a unit.

The size of the glass supporting plate will depend upon the size of the objects to be measured. In the specific case wherein the device is to be used for the determination of the total area of a cross-sectional drawing of a roadway, a replica of the drawing is made of black, matte paper. This is done by tracing the drawing onto the black paper as by placing a white, yellow, or etc., colored transfer paper therebetween. This produces an outline of the drawing on the black paper which is then cut out by scissors, or knife, to produce an opaque sheet having the exact size and configuration of the original drawing. If the cut out sheet is of a size to fit on the glass supporting plate of the particular device, only a single measurement is required to obtain the area thereof. If, however, the cut out sheet is too large for the particular device, the sheet is cut into smaller pieces, at random, which pieces may be collectively or individually measured by means of the device. If measured individually, the sum total of the desired area is obtained by adding up the individual readings obtained on the scale 28. Actual field tests of the device have established the fact that the readings obtained may be relied upon in the first instance for the submission of bids for earth removal or earth fill work. In the case of jobs wherein the bid price may be very substantial, the procedure here presented serves as a quick check of the accuracy of the areas computed mathematically. In one particular job, it required two engineers three full days to compute the amount of fill required for a given length of roadway. Five sheets of computations and 48 man hours of work were involved. By using the device herein described, the same job required only two hours of one engineer, which time included the preparation of the replicas of the drawing cross sections on the black matte paper, and the results obtained were within 1% of the calculated value. Inasmuch as the preparation of the black paper replicas of the original drawing and the operation of the device are simple operations requiring only a certain degree of care, the task can be performed by unskilled help thereby relieving engineers for devotion to more important matters.

Referring again to FIGURE 3, if the two photocells 18 and 19 are strictly linear (that is, if the output current varied linearly with the quantity of light striking the photocell surface) or if the two photocells are precisely matched to have identical non-uniform response characteristics, normal variations in the voltage applied to the lamps 13 and 20 would not disturb the balanced condition of the bridge. However, photocells are not linear and to select two precisely matched photocells increases the cost of the device. I have found that the most practical way to maintain a balanced condition of the electrical bridge throughout a normal range of line voltage variations is to apply a nominal voltage to the lamps 13 and the lamp 20 such that the rate of change of the photocell output current is constant over a practical range of voltage variation, say ±10 volts. This is done by using two variable voltage-dropping resistors, one resistor being in series with the lamp 20 and the other resistor being in series with the parallel connected lamps 13. With the orientation of the lamps 13 and the lamp 20 fixed with respect to the respectively associated photocells 18 and 19, in a given device, the line voltage can be varied to obtain individual current output versus voltage curves for the two particular photocells. One or both of the variable voltage-dropping resistors then are adjusted so that each photocell is operated at a level of illumination such that the rate of change of the individual photocell output currents is the same. Once having so determined the proper voltage to be applied to the lamps, the variable resistors are replaced by fixed resistors whereby during use of the device the electrical balance of the device is preserved throughout normal fluctuations in the line voltage. This arrangement maintains the indication accuracy of the device over the entire scale range and eliminates the need for a costly voltage regulator.

Having now described my invention and a specific construction of the device, those skilled in this art will find no difficulty in making various changes and modifications to meet specific requirements. For example, the glass plate may be made of substantially larger size and the device provided with a plurality of scales having different ranges. For example, if the scale has an initial range of 0–100 square inches, the scale range can be changed to 0–10 square inches by reducing the area of the glass plate to 10 percent (as by an opaque mask) and changing the value of one of the fixed bridge resistors to 10 ohms. Also, a gearing or pulley system may be incorporated to provide a vernier rotation of the arm carrying the vane thereby facilitating the precise balancing of the electrical circuit when a specimen is positioned on the glass plate. These and other changes and modifications can be made without departing from the scope and spirit of the invention as set forth in the following claims.

I claim:

1. A device for measuring the area of an opaque, flat specimen comprising a housing carrying a plurality of lamps spaced from a light-permeable plate which constitutes a support for the specimen; a first self-generating photocell spaced from the center of the plate and illuminated by light rays emerging from the plate; a first resistor connected across the first photocell; a second self-generating photocell spaced from a mask having an aperture formed therein; a second resistor connected across the second photocell; a third and a fourth resistor; circuit elements connecting the said four resistors to form a balanced electrical network; a lamp illuminating the second photocell through the said aperture; means for energizing all of the said lamps from a voltage source having a predetermined voltage; a pivotally-mounted arm having an opaque vane secured thereto, said vane adapted to reduce the effective size of said aperture upon pivotal movement of the said arm; a scale calibrated in units of area and cooperating with the free end of the said arm; and means for balancing the electrical network when the specimen is not positioned on the said plate and the free end of said arm is aligned with the zero mark on the scale.

2. The invention as recited in claim 1, wherein the product of the light energy multiplied by the response of the first photocell is substantially a constant for each point on the light-emerging surface of the light-permeable plate.

3. The invention as recited in claim 1, including means for energizing the said plurality of lamps and the said lamp illuminating the second photocell at predetermined voltages such that the output currents of the two photocells vary at the same rate for normal variations of the said voltage source.

4. The invention as recited in claim 1, wherein the said first and second resistors each have an ohmic value substantially less than the internal resistance of the associated photocell.

5. A device for measuring the area of an opaque, flat surface specimen comprising a closed housing, a light-permeable plate forming substantially the top surface of the housing; a plurality of lamps disposed within the housing, said lamps being divided into two sets positioned along opposed sides of the housing; a light-tight chamber pivotally secured to the housing and normally enclosing the said plate; a first self-generating photocell carried by the said chamber in spaced relation to said plate; adjustable means for positioning the lamps relative to the said plate; a second self-generating photocell; means illuminating the second photocell through an aperture; a pivotally-mounted arm carrying an opaque vane, the free end of said arm carrying a pointer movable along a scale calibrated in units of area; a four arm electrical bridge, two arms of said bridge being the two photocells each shunted by resistors and the other bridge arms consisting of fixed resistors; and a zero-center galvanometer connected to opposed diagonals of the bridge through a potentiometer, said potentiometer constituting a means for balancing the bridge when the two photocells are subjected to maximum illumination, and the said pivotally-mounted arm constituting a means for rebalancing the bridge when the specimen is positioned on the said plate to intercept some of the light striking the first photocell.

6. The invention as recited in claim 5, wherein the ohmic values of the resistors shunting each photocell are not more than 5 percent of the internal resistance of the associated photocell.

7. The invention as recited in claim 5, wherein the lamps disposed within said housing are positioned with respect to the said plate such that light rays which strike the first photocell surface at normal incidence produce the same change in photocell output as do the rays which strike the photocell surface at an angle.

8. The invention as recited in claim 5, wherein the second photocell, pivotally-mounted arm and the galvanometer are carried by a sub-housing removably attached to the said housing.

9. The invention as recited in claim 5, wherein the lamps carried by the housing are oriented with respect to the said light-permeable plate such that each light ray emerging from a given point (A) on the glass plate and striking the active surface of the first photocell conforms substantially to the relationship;

$$\left[T\frac{CP}{d_1^2}\cos\theta\right]\left[\frac{CP_A}{d_2^2}\cos\beta\right]=\text{constant}$$

where:

T is the light transmission factor of the light-permeable plate at the point A,

CP is the light energy of the lamp, in candle power, $d_1$ is the distance the light ray travels from the lamp filament to the point A projected to the under surface of the glass plate, $\theta$ is the angle from normal incidence at which the light ray passing from the lamp strikes the under surface of the glass plate, $CP_A$ is the light energy, in candle power, of the ray as it emerges from the glass plate at the point A, $d_2$ is the distance the light ray travels from the point A to the active surface of the photocell, and $\beta$ is the angle from normal incidence at which the light ray from the point A strikes the photocell surface.

References Cited in the file of this patent

UNITED STATES PATENTS

| | | |
|---|---|---|
| 2,149,958 | Fox | Mar. 7, 1939 |
| 2,447,024 | Metcalf | Aug. 17, 1948 |
| 2,510,347 | Perkins | June 6, 1950 |
| 2,578,882 | Eash | Dec. 18, 1951 |